United States Patent [19]

Wegehaupt et al.

[11] Patent Number: 4,600,657

[45] Date of Patent: Jul. 15, 1986

[54] PROTECTIVE COATINGS FOR ASPHALTIC CONCRETE SURFACES AND METHODS FOR FORMING THE SAME

[75] Inventors: Karl-Heinrich Wegehaupt; Rudolf Pusch, both of Burghausen; Hans R. Pfeffer, Emmerting, all of Fed. Rep. of Germany

[73] Assignee: Wacker-Chemie GmbH, Munich, Fed. Rep. of Germany

[21] Appl. No.: 697,377

[22] Filed: Feb. 1, 1985

[30] Foreign Application Priority Data

Feb. 21, 1984 [DE] Fed. Rep. of Germany ....... 3406266

[51] Int. Cl.$^4$ .................. B05D 3/02; B32B 9/04; B32B 11/00; D06N 5/00
[52] U.S. Cl. .................. 428/447; 427/136; 427/387; 427/393.6; 428/489; 428/703; 525/106; 528/26
[58] Field of Search .................. 427/387, 136, 393.6; 428/318.4, 447, 489, 703; 525/106; 528/26

[56] References Cited

U.S. PATENT DOCUMENTS

| | | | |
|---|---|---|---|
| 4,273,813 | 6/1981 | Meddaugh | 427/393.6 |
| 4,342,796 | 8/1982 | Brown et al. | 427/136 |
| 4,421,783 | 12/1983 | Marwitz et al. | 427/393.6 X |

*Primary Examiner*—Michael R. Lusignan

[57] ABSTRACT

Asphaltic concrete surfaces are protected from undesirable changes by applying a composition comprising a diorganopolysiloxane containing rod-shaped styrene-n-butyl acrylate copolymers which are obtained from the free-radical copolymerization of said monomers in the presence of the diorganopolysiloxane onto an asphaltic concrete surface and thereafter crosslinking the diorganopolysiloxane composition to form an elastomeric coating thereon. The asphaltic concrete surface may be coated with a primer prior to the application of the crosslinkable diorganopolysiloxane composition in order to improve the adhesion of the resultant crosslinked elastomer containing the rod-shaped copolymers. These asphaltic concrete coatings are especially useful in, for example, hydraulic engineering.

12 Claims, No Drawings

4,600,657

PROTECTIVE COATINGS FOR ASPHALTIC CONCRETE SURFACES AND METHODS FOR FORMING THE SAME

The present invention relates to protective coatings, particularly to protective coatings for asphaltic concrete surfaces and more particularly to methods for forming protective coatings on asphaltic concrete surfaces.

BACKGROUND OF THE INVENTION

German patent application No. 31 44 011 (Offenlegungsschrift) discloses a method for preventing the growth of algae on the surface of concrete which is submerged in water by coating the concrete surface with a crosslinkable composition consisting of a diorganopolysiloxane containing rod-shaped styrene-n-butyl acrylate copolymers which are formed by the free-radical copolymerization of said monomers in the presence of the diorganopolysiloxane and thereafter crosslinking the diorganopolysiloxane composition to form an elastomer on the concrete surface. The resultant elastomer protects the concrete surface from algal growth, even when submerged in water for long periods of time.

Concrete is a resistance building material, however, it must have frequent expansion joints. These concrete expansion joints, especially in hydraulic engineering, are frequently covered with asphaltic concrete coatings to prevent leaching and deterioration caused by temperature fluctuations and water penetration with the resultant freezing and thawing.

Therefore, it is an object of the present invention to protect asphaltic concrete coatings against surface changes due to leaching, temperature influences, organisms, ice formation and/or wear through the application of a coating which is stable over a long period of time. Another object of the present invention is to provide protective coatings for asphaltic concrete. Still another object of the present invention is to provide protective coatings for asphaltic concrete which is stable over a long period of time. Still another object of the present invention is to provide protective coatings which are resistant to algal growth. A further object of the present invention is to provide protective coatings for asphaltic concrete which are obtained from crosslinkable diorganopolysiloxane compositions containing rod-shaped styrene-butyl acrylate copolymers. Still a further object of the present invention is to provide a method for forming protective coatings on asphaltic concrete.

SUMMARY OF THE INVENTION

The foregoing objects and others which will become apparent from the following description are accomplished in accordance with this invention, generally speaking, by providing a protective coating for asphaltic concrete comprising a crosslinked diorganopolysiloxane elastomer containing rod-shaped styrene-n-butyl acrylate copolymers which are obtained from the free radical copolymerization of styrene and n-butyl acrylate in the presence of the diorganopolysiloxane.

The protective coating for the asphaltic concrete is prepared by applying to the surface of asphaltic concrete a crosslinkable diorganopolysiloxane composition containing rod-shaped styrene-n-butyl acrylate copolymers, in which the rod-shaped styrene-n-butyl acrylate copolymers are obtained from the free radical copolymerization of styrene and n-butyl acrylate monomers in the presence of the diorganopolysiloxane and thereafter crosslinking the diorganopolysiloxane to form an elastomer. The asphaltic concrete surface may be coated with a primer composition prior to the application of the diorganopolysiloxane composition in order to improve the adhesion of the resultant diorganopolysiloxane elastomer to the asphaltic concrete.

DETAILED DESCRIPTION OF THE INVENTION

The asphaltic concrete surfaces to be protected in accordance with this invention are preferably asphaltic fine concrete coatings which serve as an overlayer on asphaltic coarse concrete. Asphaltic fine concrete and asphaltic coarse concrete compositions are described, for example, in "Lueger Lexicon of Technology," rororo Techniklexikoz, Volume 17, Reinbek bei Hamburg, 1972, page 76/77.

Compositions which are crosslinkable to an elastomer and which are based on a diorganopolysiloxane composition containing rod-shaped sytrene-n-butyl acrylate copolymers that are produced by free-radical copolymerization of styrene and n-butyl acrylate, in the presence of the diorganopolysiloxane, have been described, for example, in U.S. Pat. Nos. 3,555,109 to Getson; 3,776,875 to Getson; 4,032,499 to Kreuzer et al. and others. Methods for preparing the crosslinkable diorganopolysiloxane compositions containing rod-shaped styrene-n-butyl acrylate copolymers have been described in Examples 6 to 8 of U.S. Pat. No. 3,555,109 to Getson; Examples 1 to 4 and 6, 8 and 9 of U.S. Pat. No. 3,776,875 to Getson, and Example 6 of U.S. Pat. No. 4,032,499 to Kreuzer et al.

The rod-shaped copolymers produced in the presence of the diorganopolysiloxane by free-radical copolymerization preferably consist of from 35 to 70 percent by weight of units derived from styrene with the remaining units derived from n-butyl acrylate.

The diorganopolysiloxane is preferably present in an amount of from 20 to 60 weight percent based on the total weight of diorganopolysiloxane and styrene-n-butyl acrylate copolymer.

It is preferred that at least 80 percent of the number of organic radicals in the diorganosiloxane units be methyl radicals because of their availability.

The diorganopolysiloxanes in whose presence the rod-shaped styrene-n-butyl acrylate copolymer is produced preferably have an average viscosity before copolymerization of from about 150 to 6000 mPa.s at 25° C.

The compositions used in the method of this invention to form coatings on the asphaltic concrete are the so-called one-component systems, that is, mixtures which are packaged in a single package, or so-called two-component systems which are prepared from at least two components more or less immediately prior to application on the surfaces to be coated. Crosslinking of the compositions preferably proceeds by the condensation reaction.

Crosslinking agents which may be employed in the one-component systems are silanes and siloxanes having hydrolyzable groups linked to the silicon atoms. Examples of hydrolyzable groups are acyloxy, oximo, alkoxy, halogen, amino, aminoxy, amido and phosphato groups.

Specific examples of such silanes are methyltriacetoxysilane, methyltris-(acetonoximo)silane, methyltris-(diethylaminoxy)silane and methyltris-(cyclohexylamino)silane.

Examples of crosslinking agents which may be employed in the two-component systems are polyalkoxysilanes and polyalkoxysiloxanes, such as ethyl orthosilicate, ethyltrimethoxysilane, methyltributoxysilane, methylbutoxydiethoxysilane, n-butyl orthosilicate; polysilicates such as ethyl polysilicate, isopropyl polysilicate, butyl polysilicate and partially hydrolyzed ethyl silicates such as ethyl silicate "40".

Crosslinking catalysts which may be employed are metallic salts of carboxylic acids such as tin naphthenate, tin octoate, dibutyltin dilaurate, tin oleate, tin stearate and lead octoate. Other catalysts which may be employed are dibutyltin butoxy chloride, tributyltin hydroxide and the like.

In addition to the crosslinkable diorganopolysiloxane, styrene-n-butyl acrylate copolymer produced in the presence of said diorganopolysiloxane as well as crosslinking agents and crosslinking catalysts, if desired, the compositions used in accordance with this invention may contain other substances. Examples of such other substances are fillers such as pyrogenically produced silicon dioxide; solvents such as alkane mixtures having a boiling range of from 80° to 110° C. at 1013 mbar (abs.), and/or aromatic hydrocarbons such as toluene; pigments such as aluminum powder; plasticizers such as trimethylsiloxy endblocked diorganopolysiloxanes having an average viscosity of from 50 to 10,000 mPa.s at 25° C. and epoxy resins. The use of epoxy resins with the diorganopolysiloxanes promotes film formation and a thick coating is more readily obtained in applying the crosslinkable composition by spraying. When crosslinkable compositions used in accordance with this invention contain an epoxy resin, the epoxy content is preferably from 3 to 6 weight percent based on the total weight of diorganopolysiloxane and copolymer produced in the presence of said diorganopolysiloxane.

Before applying the crosslinkable composition containing the diorganopolysiloxane and rod-shaped copolymers, the asphaltic concrete coating is preferably primed with a coating to improve the adhesion of the resultant elastomer to the substrate. It was found that an excellent primer which may be employed is a silane having at least one amino group bonded to silicon through carbon and at least one monovalent hydrocarbon radical bonded to silicon through oxygen per molecule which may be substituted by an amino group or alkoxy group and/or partial hydrolyzates thereof. Examples of such silanes are those of the following formulas:

CH$_3$Si(OCH$_2$CH$_2$NH$_2$)$_2$(CH$_2$)$_3$O(CH$_2$)$_2$NH$_2$
(CH$_3$O)$_3$Si(CH$_2$)$_3$NH(CH$_2$)$_2$NH$_2$
H$_2$N(CH$_2$)$_2$O(CH$_2$)$_3$Si(OCH$_2$CH$_2$NH$_2$)$_3$
H$_2$N(CH$_2$)$_2$O(CH$_2$)$_3$Si(OC$_2$H$_5$)$_3$
N-β-aminoethyl-γ-aminopropyltriethoxysilane
β-aminoethyltriethoxysilane
N-β-aminoethyl-δ-aminobutyltriethoxysilane
γ-aminopropyltriethoxysilane
aminomethyltrimethoxysilane
N-β-aminoethyl-γ-aminopropyltris(methoxyethyleneoxy)silane and
δ-aminobutyltriethoxysilane.

Preferred compounds are those having the formula H$_2$N(CH$_2$)$_2$NH(CH$_2$)$_3$Si(OR)$_3$, where R is an alkyl radical containing from 1 to 5 carbon atoms per radical or a methoxyethylene radical.

The primer composition is preferably prepared by dissolving the organosilicon compound containing at least one amino group in a solvent. Examples of a suitable solvent which can be used are alkanes having boiling points in the range of from 120° to 180° C. at 1013 mbar (abs.); aromatic hydrocarbons such as toluene and xylenes, ketones such as methyl ethyl ketone; alcohols such as ethanol and isopropanol and chlorinated hydrocarbons such as trichloroethylene.

The compositions used in accordance with this invention may be applied on the surfaces to be protected, for example, by painting, pouring, spraying or rolling on.

Under solar radiation and at air temperatures above 25° C., the temperature of the coated asphaltic concrete may be 10° to 15° C. lower than the temperature of uncoated asphaltic concrete under the same conditions. This prevents run off of the asphalt concrete from vertical or slanted surfaces which is very important, especially in tropical and subtropical zones.

The protective coatings of this invention are especially useful in hydraulic applications, such as pumping stations or water-conducting canals.

All parts and percentages in the following examples are by weight unless otherwise specified.

The asphaltic concrete specimens used in Examples 1 and 2 consist of 40×40×5 cm concrete prisms having an asphaltic coarse concrete coating thereon and an overlayer of an asphaltic fine concrete containing bitumen B 65.

EXAMPLE 1

A primer solution consisting of 30 parts of N-β-aminoethyl-γ-aminopropyltriethoxysilane, 30 parts of ethanol and 20 parts of xylene isomer mixture is applied on the surface of two of the concrete specimens described above which are coated with asphaltic concrete.

After the primer coat has dried, a crosslinkable composition prepared in accordance with the following procedure was sprayed on the primed asphaltic concrete.

A mixture consisting of 5.2 kg (50 mol) styrene, 4.2 kg (33 mol) n-butyl acrylate, 4.04 kg dimethylpolysiloxane in which each terminal unit contains a Si-bonded hydroxyl group and having a viscosity of 430 mPa.s at 25° C., 0.8 kg water and 0.14 kg 1,1-di-tert-butylperoxy-3,3,5-trimethylcyclohexane was heated under nitrogen for 7 hours in a polymerization vessel using a steam jacket maintained at 100° C. and having an inside diameter of 312 mm and a height of 600 mm and equipped with an anchor agitator operating at 200 rpm with a width of 295 mm at its widest point, a gas inlet tube and a reflux condenser. The unreacted monomers and water were removed by passing nitrogen through the reaction mixture at 100° C. to 130° C. and the reaction mixture was then heated for 3 hours at 130° C. under 16 mbar (abs.).

The diorganopolysiloxane thus obtained, containing a rod-shaped copolymer of the cited monomers formed in the presence of free radicals and the diorganopolysiloxane, has a viscosity of 45,000 mPa.s at 25° C. and an overall composition of 30 percent dimethylpolysiloxane, 31.5 percent of units derived from n-butyl acrylate and 38.5 percent of units derived from styrene.

About 65 parts of the diorganopolysiloxane composition were mixed with 35 parts of an alkane mixture having a boiling range of from 80° to 110° C. at 1013 mbar (abs.) and 1 part of pyrogenic silicon dioxide having a BET surface of 200 m$^2$/g and just prior to application to the primed asphaltic concrete was mixed with 3 parts of a mixture consisting of 1 part of $Si[OSn(C_4H_9)_2OOCCH_3]_4$ and 3 parts of tetra-n-propyl silicate. The resultant composition crosslinked to form an elastomeric coating on the primed asphaltic concrete.

EXAMPLE 2

The process described in Example 1 is repeated except that 5 percent, based on the weight of the composition, of a 70 percent solution of an epoxy resin (Epikote 1001, registered trademark of Shell Company) in toluene, were added to the crosslinkable composition.

The coated specimens prepared in accordance with the procedures described in Examples 1 and 2 were placed in a river channel on an inclined wall covered with algae for 6 months. They remained essentially free of algal growth. The elastomeric coating adheres so tightly to the 4 specimens that removal is impossible without damaging the coating or the asphaltic concrete layer.

EXAMPLE 3

A primer solution consisting of 30 parts of N-β-aminoethyl-γ-aminopropyltriethoxysilane, 40 parts of ethanol and 20 parts of xylene isomer mixture is sprayed onto inclined sample areas of concrete in various canals of a hydroelectric generating station after having been cleaned of adhering soil with a brush. In one case, the sample area was coated with asphaltic concrete approximately 15 years old (surface rough due to leaching of binder) and in another case with relatively fresh asphaltic concrete (smooth surface).

After the primer coating had been allowed to dry for 1 hour, the epoxy resin-containing composition of Example 2 is sprayed to a thickness of 300 to 500 micrometers on the primed asphaltic concrete using an airless spraying device. The coating crosslinks within 4 hours to an elastomer which adheres so tightly to the substrate that it cannot be removed without damaging the elastomer or the asphaltic concrete layer. Even after 6 months exposure below and above water, no detrimental change in the elastomer on asphaltic concrete can be detected.

Based on the temperature measurements made during solar radiation at the height of the summer, the surface temperature of the treated surfaces is approximately 15° C. lower than that of adjacent untreated asphaltic concrete surfaces.

What is claimed is:

1. A method for coating asphaltic concrete which comprises applying a crosslinkable composition comprising a diorganopolysiloxane containing rod-shaped styrene-n-butyl acrylate copolymers which are obtained from the free-radical copolymerization of said monomers in the presence of the diorganopolysiloxane, and thereafter crosslinking the diorganopolysiloxane composition to form an elastomeric coating on the asphaltic concrete.

2. The method of claim 1, wherein the composition contains a crosslinkable diorganopolysiloxane, rod-shaped styrene-n-butyl acrylate copolymers, an epoxy resin and a crosslinking agent.

3. The method of claim 1, wherein a primer composition is applied to the asphaltic concrete prior to the application of the diorganopolysiloxane composition.

4. The method of claim 2, wherein the composition contains a crosslinking catalyst.

5. The method of claim 3, wherein the primer is selected from the group consisting of a silane in which each molecule contains at least one amino group bonded to silicon through carbon and at least one monovalent hydrocarbon radical bonded to silicon through oxygen, which may be substituted with an amino group or alkoxy group, partial hydrolyzates and mixtures thereof.

6. The method of claim 3, wherein the primer is a silane of the formula $$H_2N(CH_2)_3NH(CH_2)_3Si(OR)_3$$

where R is selected from the group consisting of an alkyl radical having from 1 to 5 carbon atoms per radical and a methoxyethylene radical.

7. The coated asphaltic concrete obtained from the method of claim 1.

8. The coated asphaltic concrete obtained from the method of claim 2.

9. The coated asphaltic concrete obtained from the method of claim 3.

10. The coated asphaltic concrete obtained from the method of claim 4.

11. The coated asphaltic concrete obtained from the method of claim 5.

12. The coated asphaltic concrete obtained from the method of claim 6.

* * * * *